US012790168B2

(12) United States Patent
Smith

(10) Patent No.: US 12,790,168 B2
(45) Date of Patent: Nov. 10, 2026

(54) METHOD AND APPARATUS TO DETERMINE A VERTICAL POSITION OF AN ELEVATOR IN A HOISTWAY

(71) Applicant: TK Elevator Innovation and Operations GmbH, Düsseldorf (DE)

(72) Inventor: Rory Stephen Smith, Henderson, NV (US)

(73) Assignee: TK Elevator Innovation and Operations GmbH, Düsseldorf (DE)

( * ) Notice: Subject to any disclaimer, the term of this patent is extended or adjusted under 35 U.S.C. 154(b) by 869 days.

(21) Appl. No.: 18/134,283

(22) Filed: Apr. 13, 2023

(65) Prior Publication Data

US 2024/0343525 A1 Oct. 17, 2024

(51) Int. Cl.
*B66B 1/34* (2006.01)

(52) U.S. Cl.
CPC .................................. *B66B 1/3492* (2013.01)

(58) Field of Classification Search
CPC .................................................... B66B 1/3492
USPC .......................................................... 187/394
See application file for complete search history.

(56) References Cited

U.S. PATENT DOCUMENTS 10,578,639 B2 3/2020 Bogli et al.
10,822,199 B2 11/2020 Pahlke et al.
2011/0067958 A1* 3/2011 Schuster ............... B66B 1/3423 187/393
2020/0361749 A1 11/2020 Pahlke
2021/0032076 A1* 2/2021 Pahlke ....................... B66B 5/04
2021/0087018 A1* 3/2021 Pahlke .................. B66B 1/3446
2021/0094794 A1 4/2021 Pahlke
2022/0112050 A1 4/2022 Trcka
2022/0112051 A1 4/2022 Blanchard et al.

FOREIGN PATENT DOCUMENTS

CN 108726299 A 11/2018
CN 110498310 A 11/2019
WO 2017016937 A1 2/2017

* cited by examiner

*Primary Examiner* — Erick D Glass
(74) *Attorney, Agent, or Firm* — Dinsmore & Shohl LLP

(57) ABSTRACT

A method for determining the vertical position of an elevator cab in a hoistway comprising the steps of: providing an elevator cab positioned in a hoistway; providing an accelerometer attached to the elevator cab; providing a monitoring controller communicatively coupled to the accelerometer; measuring an acceleration using the accelerometer for a run sequence of the elevator cab; calculating a double integration of the acceleration determining a first estimated position of the elevator cab in the hoistway; measuring a change in acceleration using the accelerometer and detecting at least one buffet; determining a second estimated position of the elevator cab in the hoistway based upon the at least one detected buffet; comparing the first and second estimated positions; and updating a position of the elevator cab in the hoistway and determining a floor level. A pressure sensor may also be used to detect the buffet.

20 Claims, 11 Drawing Sheets

METHOD AND APPARATUS TO DETERMINE A VERTICAL POSITION OF AN ELEVATOR IN A HOISTWAY

TECHNICAL FIELD

The present disclosure generally relates to elevator assemblies and, more particularly, to systems and methods for determining a position of an elevator in a hoistway.

BACKGROUND

Determining an elevator position in a hoistway may be achieved using an accelerometer. Accelerations must be double integrated to calculate position. Using an accelerometer to determine the vertical position of an elevator is difficult due to accelerometer drift and the cumulative effect of integration errors. The longer the distance traveled, the greater the integration errors. Further, the longer the duration of an elevator journey, the greater the effect of drift. The drift and integration errors may cause errors in the detected position of an elevator.

There is therefore a need in the art for a structure and method to correct the positioning errors caused by the double integration of accelerometers.

SUMMARY

In one aspect, there is disclosed a method for determining the vertical position of an elevator cab in a hoistway comprising the steps of: providing an elevator cab positioned in a hoistway; providing an accelerometer attached to the elevator cab; providing a monitoring controller communicatively coupled to the accelerometer; measuring an acceleration using the accelerometer for a run sequence of the elevator cab; calculating a double integration of the acceleration determining a first estimated position of the elevator cab in the hoistway; measuring a change in acceleration using the accelerometer and detecting at least one buffet; determining a second estimated position of the elevator cab in the hoistway based upon the at least one detected buffet; comparing the first and second estimated positions; and updating a position of the elevator cab in the hoistway and determining a floor level.

In another aspect, there is disclosed a method for determining the vertical position of an elevator cab in a hoistway comprising the steps of: providing an elevator cab positioned in a hoistway; providing an accelerometer attached to the elevator cab; providing a pressure sensor either on the cab or within the hoistway; providing a monitoring controller communicatively coupled to the accelerometer and the pressure sensor; measuring an acceleration using the accelerometer for a run sequence of the elevator cab; calculating a double integration of the acceleration determining a first estimated position of the elevator cab in the hoistway; measuring a change in pressure using the pressure sensor and detecting at least one buffet determining a third estimated position of the elevator cab in the hoistway; comparing the first and third estimated positions; and updating a position of the elevator cab in the hoistway and determining a floor level.

In yet another aspect there is disclosed a method for determining the vertical position of an elevator cab in a hoistway comprising the steps of: providing an elevator cab positioned in a hoistway; providing an accelerometer attached to the elevator cab; providing a pressure sensor either on the cab or within the hoistway; providing a monitoring controller communicatively coupled to the accelerometer and the pressure sensor; measuring an acceleration using the accelerometer for a run sequence of the elevator cab; determining a first estimated position of the elevator cab in the hoistway; measuring a change in pressure using the pressure sensor detecting at least one buffet determining a third estimated position of the elevator cab in the hoistway; measuring a change in acceleration using the accelerometer detecting at least one buffet determining a second estimated position of the elevator cab in the hoistway; comparing the first, second and third estimated positions; and updating a position of the elevator cab in the hoistway and determining a floor level.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Embodiments of the present disclosure are directed to improved systems and methods to monitor and identify a position of an elevator within a hoistway. More specifically, the disclosed systems and methods provide an approach for improved position determination by utilizing a change in acceleration or a change in pressure to detect a buffet indicative of a landing position or the position of a counter weight within the hoistway.

As such, the various components described herein may be used to carry out one or more processes to improve accuracy of determining a position of the elevator within a hoistway and of a floor level.

Figure 1A:
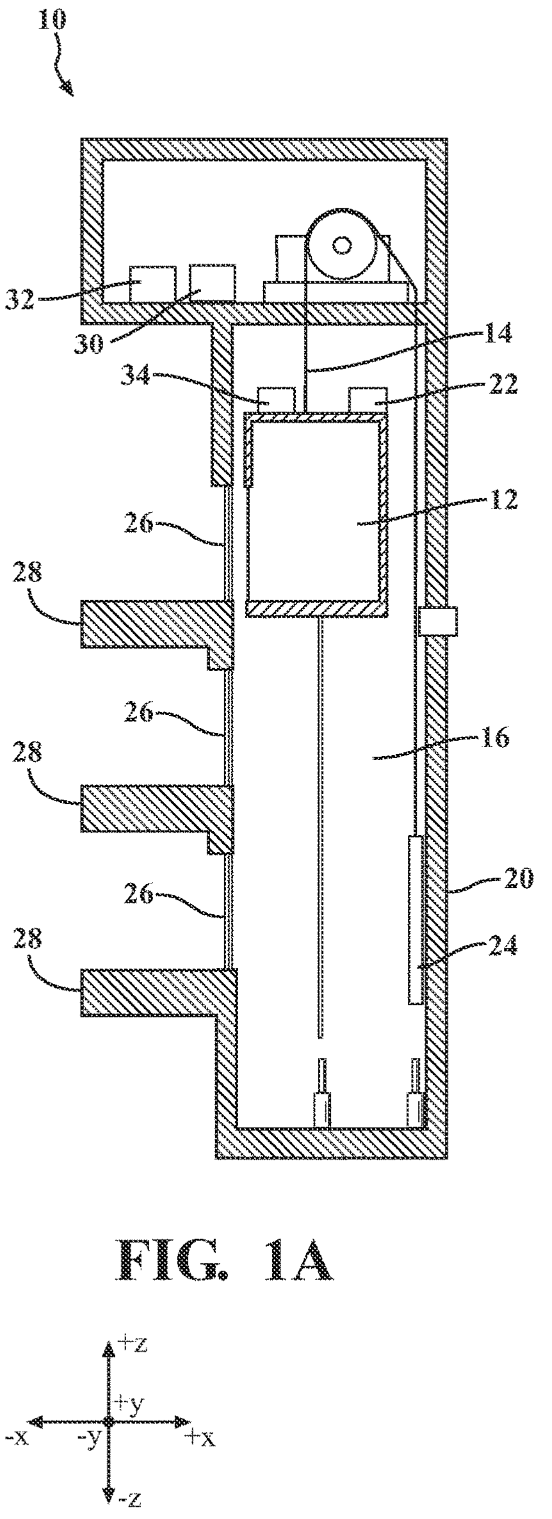
FIG. 1A schematically depicts a first aspect of an example elevator assembly schematic according to one or more embodiments shown and described herein.

As used herein, the term "longitudinal direction" refers to the forward-rearward direction of the elevator assembly (i.e., in a +/−Y direction of the coordinate axes depicted in FIG. 1A). The term "lateral direction" refers to the cross-direction (i.e., along the X axis of the coordinate axes depicted in FIG. 1A), and is transverse to the longitudinal direction. The term "vertical direction" refers to the upward-downward direction of the elevator stabilizing assembly (i.e., in the +/−Z direction of the coordinate axes depicted in FIG. 1A).

The phrase "communicatively coupled" is used herein to describe the interconnectivity of various components of the monitoring system for elevator assemblies and means that the components are connected either through wires, optical fibers, or wirelessly such that electrical, optical, data, and/or electromagnetic signals may be exchanged between the components. It should be understood that other means of connecting the various components of the system not specifically described herein are included without departing from the scope of the present disclosure.

Figure 1B:
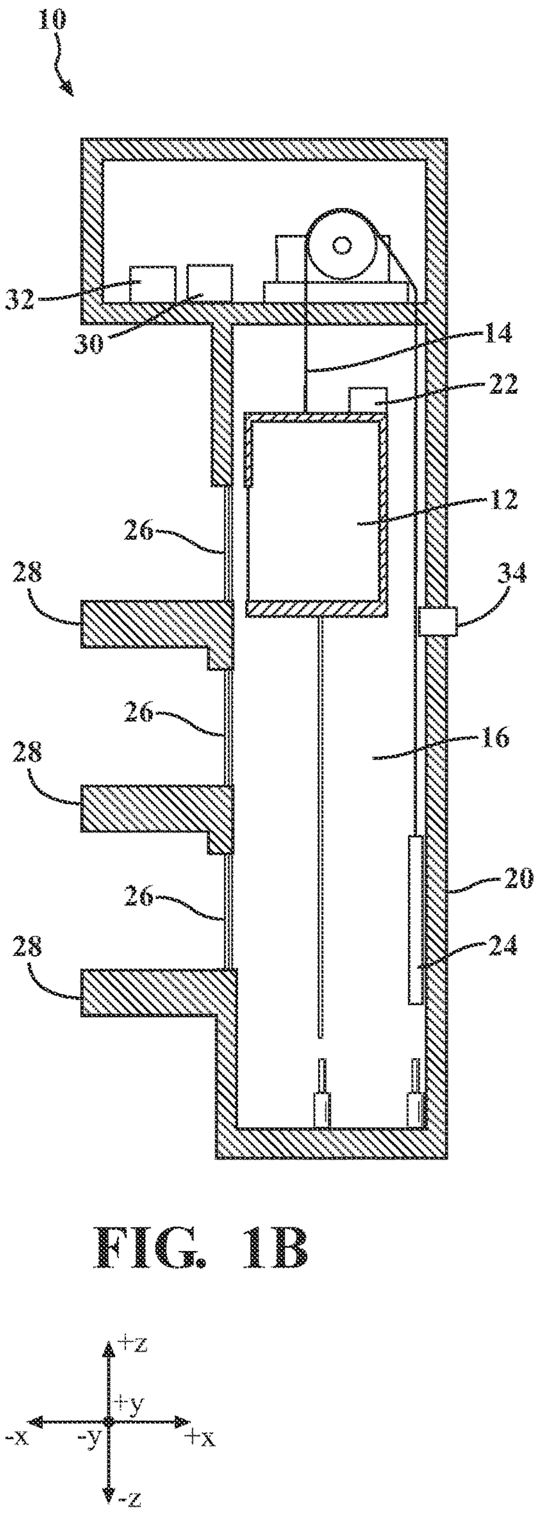
FIG. 1B schematically depicts a second aspect of an example elevator assembly schematic according to one or more embodiments shown and described herein.

Referring now to the drawings, FIGS. 1A-1B depict an elevator assembly schematic that illustrates various components for a first aspect and a second aspect of an example elevator assembly 10. In this aspect, the example elevator assembly 10 may include an elevator cab 12, a plurality of elevator hoisting members 14 illustrated for schematic reasons as a single suspension member and herein referred to as hoisting members, a hoistway 16 or elevator shaft, and a plurality of weights 24 retained within the hoistway 16 that act as a counterweight to the elevator cab 12. The plurality of weights 24 move within the hoistway 16 in the system vertical direction (i.e., in the +/−Z direction). The plurality of elevator hoisting members 14 move the elevator cab 12 between a plurality of positions within the hoistway 16 including to a plurality of landings.

The elevator assembly includes an accelerometer 22 attached to the elevator cab. In one aspect, the accelerometer 22 measures the acceleration of the elevator cab within the hoistway 16. This measured value may be double integrated to determine a position of the elevator cab 12 within the hoistway 16 according to the basic equations presented below.

(1) The integral of acceleration over time is change in velocity ($\Delta v=\int a\, dt$).

(2) The integral of velocity over time is change in position ($\Delta s=\int v\, dt$).

Using an accelerometer 22 to determine the vertical position of the elevator cab 12 is difficult due to accelerometer drift and the cumulative effect of integration errors. The longer the distance traveled the greater the integration errors and the longer the duration of an elevator journey, the greater the effect of drift.

In one aspect, the example elevator assembly 10 may further include a pressure sensor 34. The pressure sensor 34 may be positioned on the elevator cab 12, as best illustrated in FIG. 1A, or, alternatively, the pressure sensor 34 may be positioned in the hoistway 16, fixedly coupled or otherwise attached to a wall 20 or frame, and/or the like, as best illustrated in FIG. 1B. The pressure sensor 34 can be used to detect a vertical position of the elevator cab 12 in the hoistway 16, as discussed in greater herein. The pressure sensor 34 may be used as an altimeter to determine a vertical position of the elevator cab 12 in the hoistway 16.

The pressure sensor 34 may take periodic pressure readings. The difference between a new pressure reading and a previous measured pressure reading is calculated (ΔPressure). The pressure at a specified height in the hoistway 16 is known. From the calculated change in pressure, a change in position may be determined. At elevations of buildings that use an elevator, the change in pressure will be linear relative to the change in height (Δ Height) such that Δ Pressure equates to Δ Height.

The pressure sensor 34 also detects at least one and/or a plurality of pressure pulses or buffets as will be discussed in more detail below.

Figure 2A:
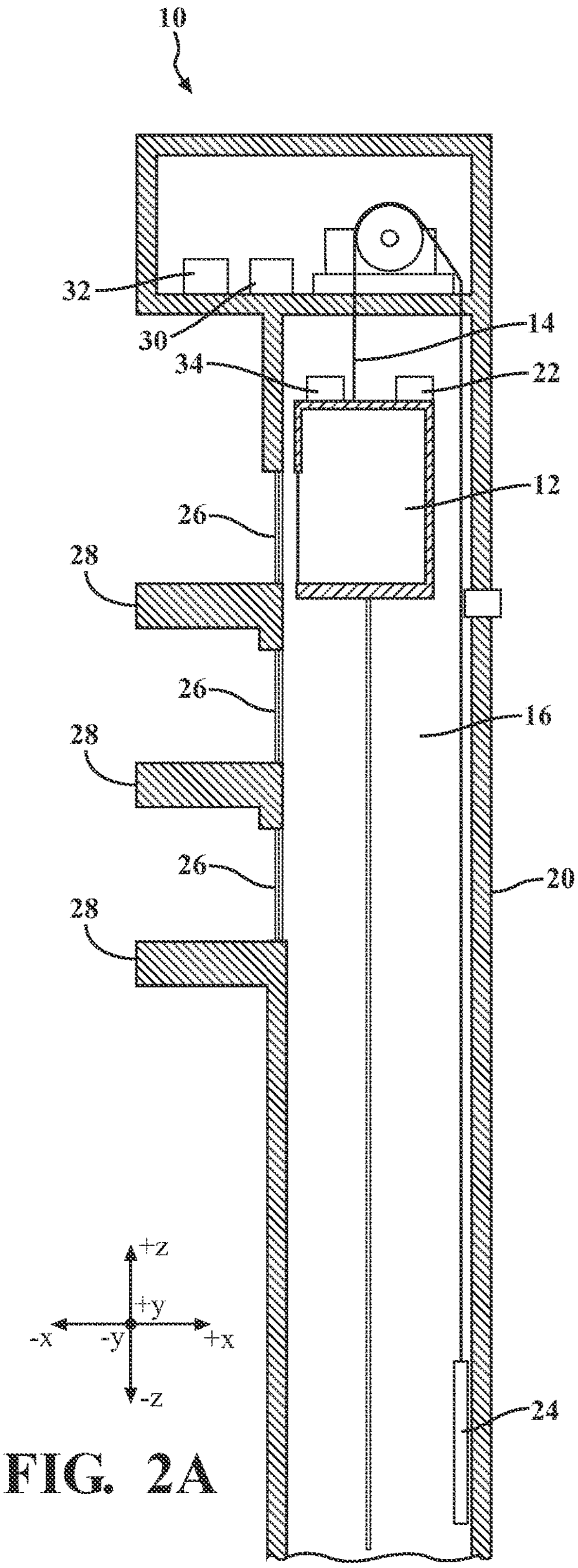
FIG. 2A schematically depicts a third aspect of an example elevator assembly schematic according to one or more embodiments shown and described herein.
Figure 2B:
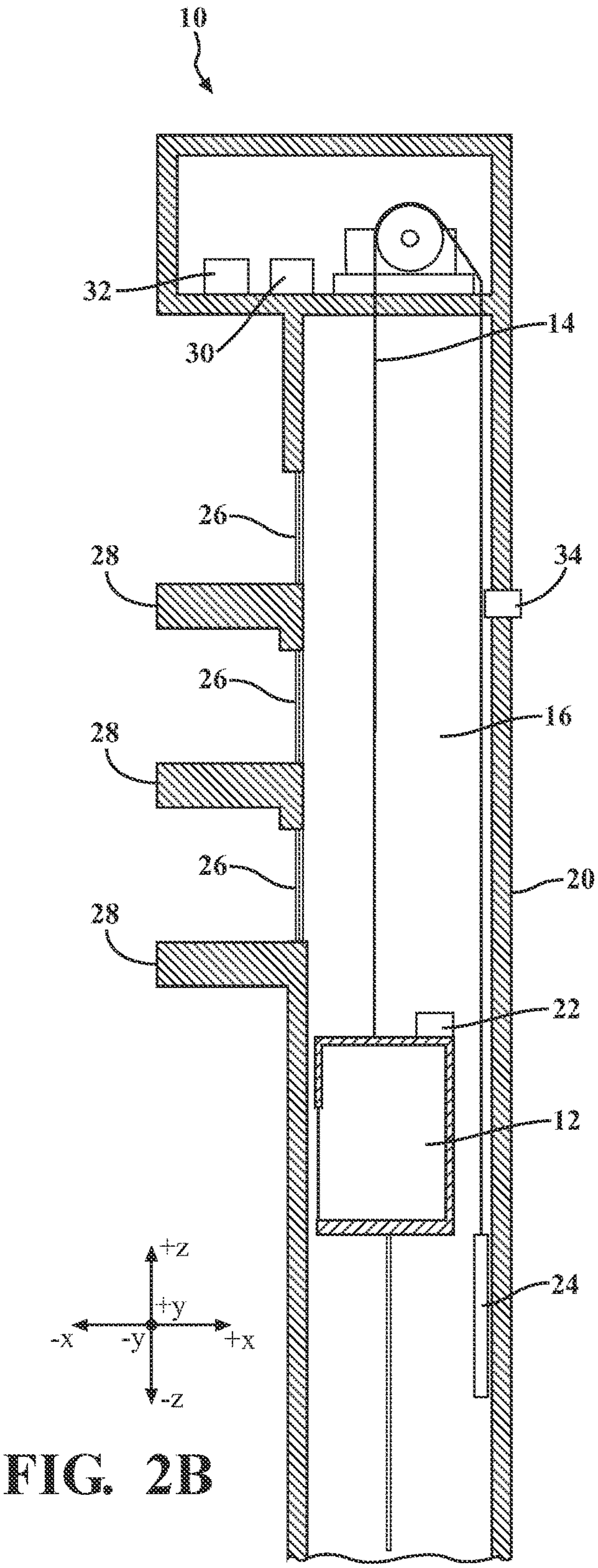
FIG. 2B schematically depicts a fourth aspect of an example elevator assembly schematic according to one or more embodiments shown and described herein.

Referring to FIG. 2A, the depicted embodiment is similar to that of FIG. 1A with the bottom floor removed and further includes an express zone that does not include doorways 26 or landings 28 in the express zone and also to FIG. 2B where the depicted embodiment is similar to that of FIG. 1B with the bottom floor removed and further includes an express zone that does not include doorways 26 or landings 28 in the express zone.

As the elevator cab 12 travels vertically through the hoistway 16 it passes doorways 26 into the hoistway 16 when not in the express zone. These are the doorways 26 through which passengers pass when entering or exiting the elevator cab 12 or emergency access doors into the hoistway 16. At the locations of the doorways 26 the area of the hoistway 16 may be larger than between floors where there are no doors.

The elevator cab 12 acts like a piston as it travels through the hoistway 16. When the elevator cab 12 passes a floor corresponding to the doorway 26 and/or landing 28, the change in area creates a change in pressure that can be detected throughout the hoistway 16.

Additionally, this change in pressure creates an aerodynamic buffet that can be detected by the accelerometer 22. In one aspect, the accelerometer 22 may detect a change in acceleration or vibration in the x or y axis of the elevator cab 12. The pressure sensor 34 and accelerometer 22 can be used to detect floor levels, and/or landings 28, and/or doorways 26. The floor passing buffet and pressure pulse can be used to fix or assign the floor level and zero out the position errors that have resulted from accelerometer drift and integration errors. Additionally, when the elevator cab 12 and the weights 24 (counterweight) cross each other at the midpoint of the hoistway 16, a similar buffet and pressure change is created that can also be used as a position fix, as best illustrated in FIG. 2B. Further, it should be understood that the pressure sensor 34, while depicted in FIG. 2B as attached to the wall 20, this is non-limiting and the pressure sensor 34 may be mounted or coupled to any component of the elevator assembly 10 including the elevator cab 12 to detect the buffet and pressure change created by the elevator cab 12 and the weights 24 (counterweight) cross each other.

Referring back to FIGS. 1A-1B and 2A-2B, the monitoring controller 30 for use with the example elevator assembly 10 may be configured to permit the transmitting and receiving of electrical signals for electrical monitoring by the monitoring controller 30 of a position of the elevator within the hoistway. The monitoring controller 30 may be communicatively coupled to the accelerometer 22 and/or to the pressure sensor 34 and to an elevator controller 32. In some embodiments, the monitoring controller 30 may be the elevator controller 32 and not a separate controller and/or may be a module of the elevator controller 32.

The monitoring controller 30 and/or the elevator controller 32 may be an electronic control unit or a central processing unit. As such, the monitoring controller 30 includes the necessary components to be communicatively coupled to the monitoring system 400 (FIG. 4), as discussed in greater detail herein. That is, the monitoring controller 30 may have data storage, software modules, and a processor, such as those commonly found in a central processing unit, and may have multiple inputs for various signal cables to be communicatively coupled to the accelerometer 22 and the pressure sensor 34, as discussed in greater detail herein with respect to FIGS. 5A-5C.

In operation, the monitoring controller 30 of the monitoring system 400 (FIG. 4) may receive continuous electrical monitoring signals (i.e., signals generated by the accelerometer 22 and/or the pressure sensor 34) from movement of the elevator cab 12. At discrete intervals, each of the signals are analyzed by the monitoring controller 30 and/or the elevator controller 32 of the monitoring system 400 by calculating a double integral of the signal generated by the accelerometer 22 to provide a first estimated position of the elevator cab 12. Alternatively, at discrete intervals, the signals are analyzed by the monitoring controller 30 and/or the elevator controller 32 of the monitoring system 400 (FIG. 4) by calculating a change in pressure (ΔPressure equates to Δ Height) to provide a first estimated position of the elevator cab 12.

Additional signals may be analyzed corresponding to signals generated by the accelerometer 22 or by the pressure sensor 34 that occur at the doorway 26 corresponding to the landing 28 of a floor, as described above. The signals may be analyzed to determine a floor level and to correct integration errors and drift as described above.

Figure 4:
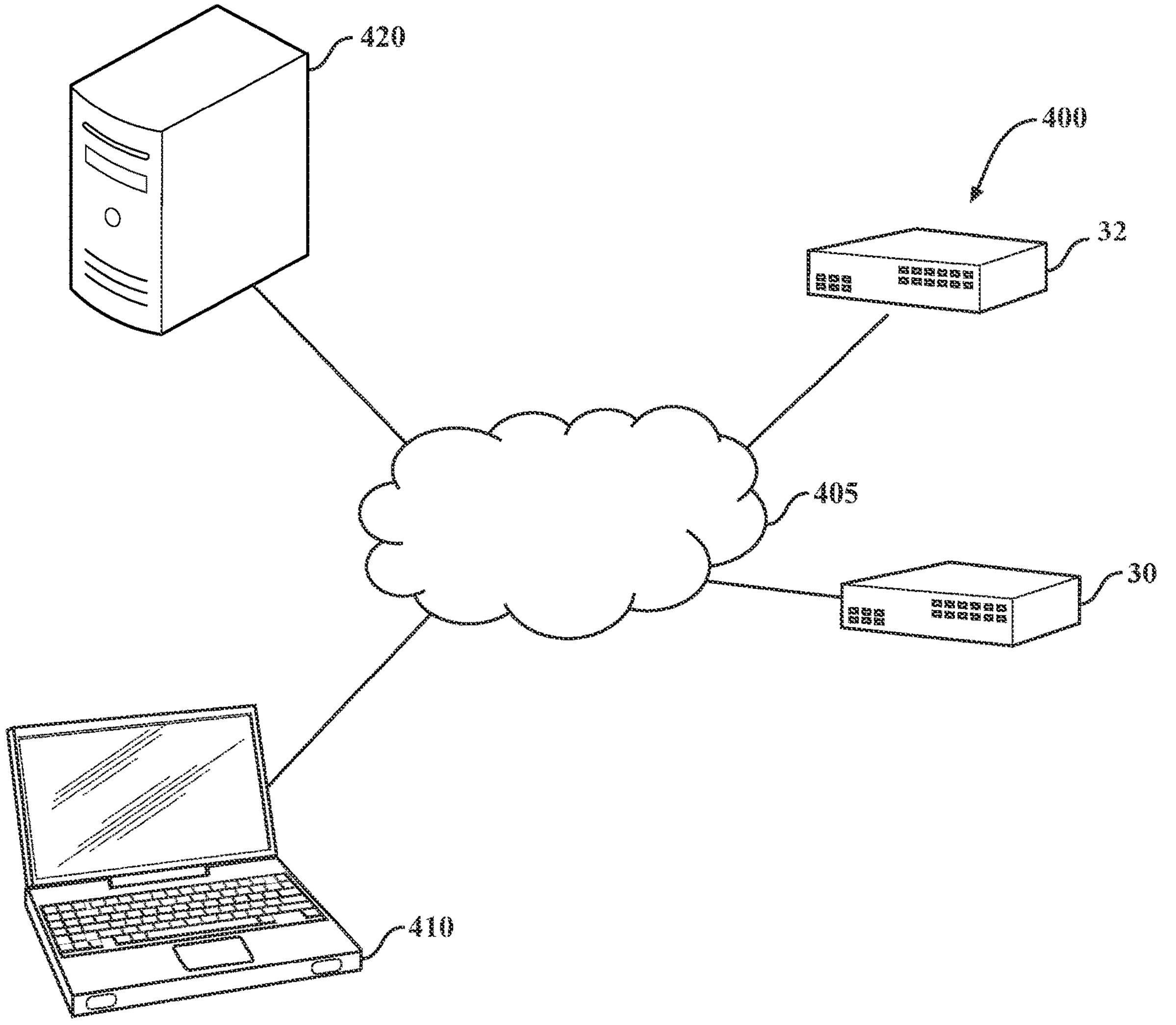
FIG. 4 schematically depicts an illustrative monitoring system having components for monitoring a movement of an elevator according to one or more embodiments described and illustrated herein.

Referring now to FIG. 4, components of the illustrative monitoring system 400 configured to monitor the movement and/or position of elevator cab 12 is schematically depicted, according to embodiments shown and described herein. The monitoring system 400 may generally be configured to communicatively couple one or more computing devices and/or components thereof to the accelerometer 22 (FIG. 1A) and/or pressure sensor 34 (FIG. 1A) within the elevator assembly 10. As illustrated in FIG. 4, illustrative computing devices may include, but are not limited to, an electronic computing device 410, a server computing device 420, the elevator controller 32, and the monitoring controller 30. Further, it should be appreciated that these devices may be local to the elevator assembly 10 or may be remote from the elevator assembly 10 and/or combinations thereof.

The computer network 405 may include a wide area network (WAN), such as the internet, a local area network (LAN), a mobile communications network, a public service telephone network (PSTN) a personal area network (PAN), a metropolitan area network (MAN), a virtual private network (VPN), and/or another network. Some components of the computer network 405 may be wired to one another using Ethernet (e.g., the monitoring controller 30, and/or the elevator controller 32) or hard wired to one another using conventional techniques known to those skilled in the art.

The components and functionality of the monitoring controller 30 will be set forth in detail below. It should be understood that the monitoring controller 30 may be part of the elevator controller 32 or the elevator controller 32 may replace the monitoring controller 30. The elevator controller 32 may be configured to control movement of the elevator cab 12 as discussed in greater detail herein.

Referring now to FIGS. 1A-1B, 2A-2B, 3A-3F and 4, the electronic computing device 410 may generally provide an interface between a user and the other components connected to the monitoring system 400. In some embodiments, the electronic computing device 410 may be a user-facing device, such as any personal electronic device. For example, a laptop, mobile phone, tablet, desktop computer, and/or the like, that is positioned remote to the elevator controller 32 and/or the monitoring controller 30. In other embodiments, the electronic computing device 410 may be a human machine interface (HMI) or other electronic computing device positioned at and/or commutatively coupled to the elevator controller 32. The electronic computing device 410 may be used to perform one or more user-facing functions, such as receiving one or more inputs or data from the monitoring system 400. The electronic computing device 410 may present a user with a user interface that displays data, permits the user to interact with the data, set predetermined threshold values and adjust as necessary, and/or the like, as discussed in greater detail herein.

In some embodiments, the electronic computing device 410 may be configured to provide desired oversight, updating, and/or correction to the monitoring controller 30, the elevator controller 32 and/or the server computing device 420. The electronic computing device 410 may also be used to connect additional electronic computing devices 410, monitoring controllers 30 elevator controllers 32, server computing devices 420, and/or the like, to the network 405.

The monitoring controller 30 may receive data from one or more sources (e.g., from the accelerometer 22, the pressure sensor 34, the elevator controller 32, the electronic computing device 410, and/or the like), generate data, store data, index data, search data, and/or provide data to the electronic computing device 410, the server computing device 420, and/or the elevator controller 32 (or components thereof). In some embodiments, the monitoring controller 30 may employ one or more algorithms that are used for the purposes of determining a position of the elevator cab 12 within the hoistway 16.

For example, a current signal that is transmitted and/or generated from the accelerometer 22 or pressure sensor 34 is received by the monitoring controller 30 after being filtered and converted to a digital signal. The digital signal may be converted into a double integral value indicative of a first estimated position of the elevator cab 12 from the accelerometer 22. Alternatively, a signal indicative of a pressure change is transmitted and/or generated from the pressure sensor 34 indicative of a first estimated position of the elevator cab 12.

Additionally, a signal from the accelerometer 22 may be provided indicating a buffet or change in acceleration corresponding to either the doorway 26 in the hoistway or passing the counter weights 24 as described above.

This signal may be indicative of a second estimated position of the elevator cab 12. Further, a signal from the pressure sensor 34 may be provided indicating a buffet or change in pressure corresponding to either the doorway 26 in the hoistway 16 or passing the counter weights 24 as described above. This signal may be indicative of a third estimated position of the elevator cab 12.

The monitoring controller 30 may be used to produce data, such as establishing threshold values for the various positions of the elevator cab 12. It should be appreciated that, in some embodiments, the elevator controller 32 may function as the monitoring controller 30 such that the elevator controller 32 performs some or all of the functionality of the monitoring controller 30, as discussed in greater detail herein. It should be appreciated that, in other embodiments, the electronic computing device 410 may function as the monitoring controller 30 such that the electronic computing device 410 performs some or all of the functionality of the monitoring controller 30, as discussed in greater detail herein. The components and functionality of the monitoring controller 30 will be set forth in detail below in FIGS. 5A-5C.

The server computing device 420 may be positioned onsite or remote to the elevator assembly 10. The server computing device 420 may receive data from one or more sources (e.g., from the monitoring controller 30, the elevator controller 32, and/or the like), and may generate data, store data, index data, search data, and/or provide data to various components such as the electronic computing device 410, the elevator controller 32, and/or the like. In some embodiments, the server computing device 420 may store data from the monitoring controller 30 to reduce the amount of data storage held onto the monitoring controller 30. Further, the server computing device 420 may store data received from the elevator controller 32 such as data related to the elevator controller 32 and/or data received from the monitoring controller 30.

Still referring to FIGS. 1A-1B, 2A-2B, 3A-3F and 4, the elevator controller 32 provides commands to move the elevator cab 12 and to the actuators of the elevator cab 12 to open or close the doors, and/or the like. Further, the elevator controller 32 may communicate movements, or lack of movements, of the elevator cab 12 to the monitoring controller 30 such that the monitoring controller 30 may collect electrical signal samples at various predetermined movements of the elevator cab 12 or at predetermined intervals of idle time of the elevator cab 12. As such, the elevator controller 32 may receive data from various sensors, from the monitoring controller 30, and/or the like, and control the elevator assembly 10 through sequences of operation and real-time calculations or algorithms. As such, the elevator controller 32 may contain the requisite processing device, hardware, software, and/or the like, to perform the functionalities relating to moving elevator cabs, hoisting members, doors, and the like between and stopping at landings, and/or the like, generally associated with the elevator assembly 10.

It should be understood that the illustrative monitoring system 400 and components thereof (e.g., the monitoring controller 30, the electronic computing device 410, the server computing device 420, the elevator controller 32, and/or the like) may gather and transform data for better estimating an actual, real time condition of the position of the elevator cab 12 rather than using merely conventional means. As such, the components of the monitoring system 400 transform raw data received from the accelerometer 22 and the pressure sensor 34 and using various logic modules, machine learning techniques, and/or the like, determines a corrected position.

It should be understood that while the electronic computing device 410 is depicted as a personal computer, the server computing device 420 is depicted as a server, the monitoring controller 30 is depicted as a generic controller, and the elevator controller 32 is depicted as a generic controller, these are merely examples. More specifically, in some embodiments, any type of computing device (e.g., mobile computing device, personal computer, server, and the like) may be utilized for any of these components. Additionally, while each of these computing devices is illustrated in FIG. 4 as a single piece of hardware, this is also an example. More specifically, each of the electronic computing device 410, the server computing device 420, the monitoring controller 30, and the elevator controller 32 may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 5A:
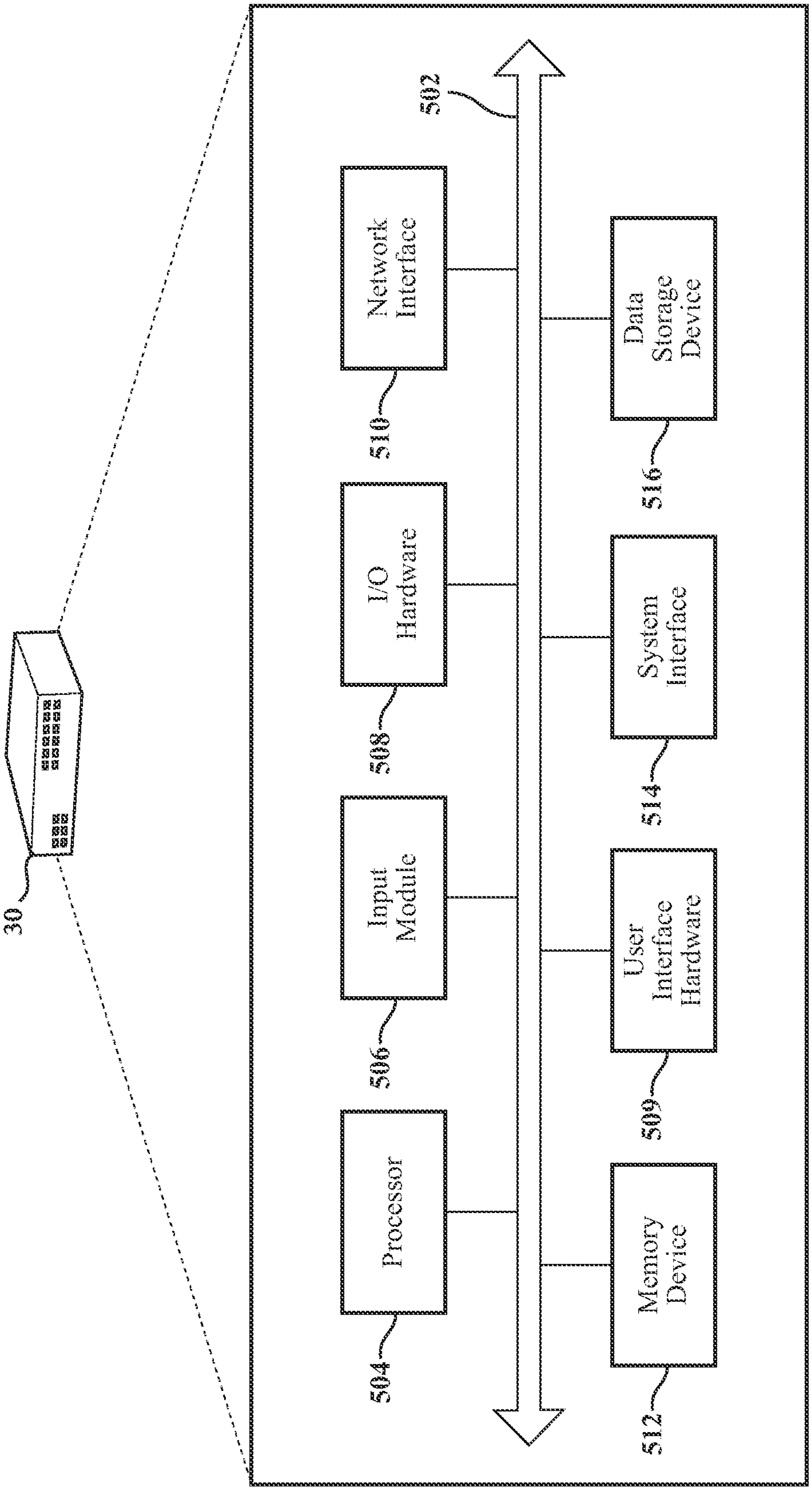
FIG. 5A schematically depicts illustrative hardware and software components of the monitoring controller that may be used for monitoring the movement of elevator according to one or more embodiments described and illustrated herein.

Now referring to FIG. 5A which depicts the monitoring controller 30, further illustrating a system that identifies a position of the elevator cab 12 within the elevator assembly 10 by utilizing hardware, software, and/or firmware, according to embodiments shown and described herein. The monitoring controller 30 may include a non-transitory, computer readable medium configured for receiving raw data from various sources (e.g., the accelerometer 22, the pressure sensor 34, the elevator controller 32 and/or the like), performing the various functions described herein such as those discussed with respect to FIGS. 3A-3F, providing commands to update a position of the elevator cab 12, alerting a user, and/or the like, embodied as hardware, software, and/or firmware, according to embodiments shown and described herein.

While in some embodiments, the monitoring controller 30 may be configured as a general purpose computer with the requisite hardware, software, and/or firmware, in other embodiments, the monitoring controller 30 may be configured as a special purpose computer designed specifically for performing the functionality described herein. For example, the monitoring controller 30 may be a specialized device that particularly receives raw data, analyzes and transforms the raw data into new data, and applies algorithms, to the new data (e.g. digital data) to generate and compare data determining an actual, real time, operating position of the elevator cab 12.

As illustrated in FIG. 5A, in some embodiments, the monitoring controller 30 may include a processor 504, input module 506, an input module 506, I/O hardware 508, user interface hardware 509, network interface hardware 510, a system interface 514, and a data storage device 516. The memory device 512 may be non-transitory computer readable memory. The memory device 512 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory device 512 may be configured to store operating logic 530, display or alert logic 532, pressure logic 534, comparison logic 536, double integration logic 538, buffet logic 539, and current position logic 540 (each of which may be embodied as a computer program, firmware, or hardware, as an example). The processor 504, such as a computer processing unit (CPU), may be the central processing unit of the monitoring controller 30, performing calculations and logic operations to execute a program. The processor 504, alone or in conjunction with the other components, is an illustrative processing device, computing device, electronic control unit, or combination thereof. The processor 504 may include any processing component configured to receive and execute instructions (such as from the data storage device 516 and/or the memory device 512).

Still referring to FIG. 5A, the input module 506 may include tactile input hardware (i.e. a joystick, a keyboard, a mouse, a knob, a lever, a button, and/or the like) that allows the user to directly input settings. The I/O hardware 508 may communicate information between the local interface 502 and one or more other components of the monitoring system 400 (FIG. 4). For example, the I/O hardware 508 may act as an interface between the monitoring controller 30 and other components, such as the electronic computing device 410, and/or the like. In some embodiments, the I/O hardware 508 may be utilized to transmit one or more commands to the other components of the monitoring system 400 (FIG. 4).

Still referring to FIG. 5A, the user interface hardware 509 may permit information from the local interface 502 to be provided to the user, whether the user is local to the monitoring controller 30 or remote from the monitoring controller 30 (e.g., a user of the electronic computing device 410 (FIG. 4)). Still referring to FIG. 5A, the user interface hardware 509 may incorporate a display and/or one or more input devices such that information is displayed on the display in audio, visual, graphic, or alphanumeric format and/or receive inputs. Illustrative input devices include, but are not limited to, the devices discussed with respect to the input module 506, a keyboard, a touch screen, a remote control, a pointing device, a video input device, an audio input device, a haptic feedback device, and/or the like.

The network interface hardware 510 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 510 may provide a communications link between the monitoring controller 30 and the other components of the monitoring system 400 depicted in FIG. 4, including, but not limited to, the server computing devices 420, the electronic computing device 410, the elevator controller 32, and/or the like, as depicted in FIG. 4.

The system interface 514 may generally provide the monitoring controller 30 with an ability to interface with one or more external devices such as, for example, the electronic computing device 410, the elevator controller 32, and/or the like depicted in FIG. 4. Communication with external devices may occur using various communication ports (not shown). An illustrative communication port may be attached to a communications network.

Figure 5B:
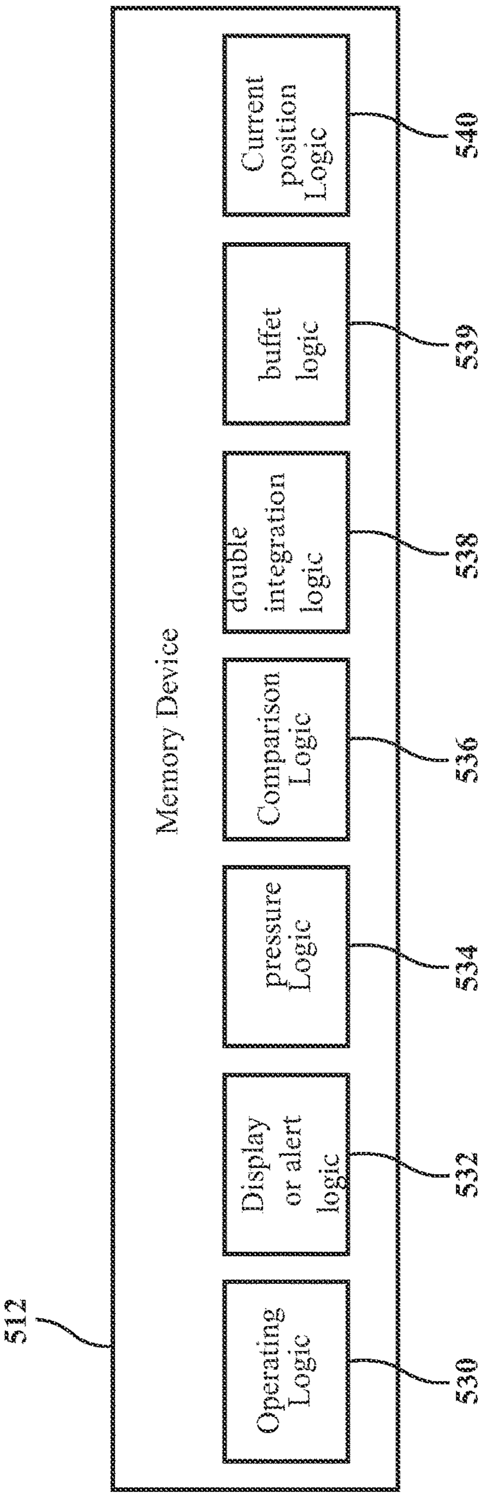
FIG. 5B schematically depicts an illustrative memory component containing illustrative logic components according to one or more embodiments shown and described herein.

With reference to FIG. 5B and back to FIGS. 3A-F, in some embodiments, the program instructions contained on the memory device 512 may be embodied as a plurality of software modules, where each module provides programming instructions for completing one or more tasks. For example, FIG. 5B schematically depicts the memory device 512 containing illustrative logic components according to one or more embodiments shown and described herein. As shown in FIG. 5B, the memory device 512 may be configured to store various processing logic, such as, for example, operating logic 530, display or alert logic 532, pressure logic 534, comparison logic 536, double integration logic 538, buffet logic 539, and current position logic 540 (each of which may be embodied as a computer program, firmware, or hardware, as an example). The operating logic 530 may include an operating system and/or other software for managing components of the monitoring controller 30. Further, the operating logic 530 may contain one or more software modules for transmitting data, and/or analyzing data.

Still referring to FIG. 5B, the display or alert logic 532 may contain one or more software modules for converting data into a display, such as a current floor level and/or alerting to the current floor position.

The comparison logic 536 may contain one or more software modules for comparing a first estimated position with a second estimated position and a third estimated position as described above. The comparison logic 536 may include and/or use a lookup table and/or the like that establishes a correlation or comparison between the estimated positions. The comparison logic 536 may perform calculations to use as inputs into algorithms such as machine learning, simulation processes, and/or the like.

Still referring to FIG. 5B, the double integration logic 538 may contain one or more software modules for calculating a first estimated position of the elevator cab as described above.

Still referring to FIG. 5B, the buffet logic 539 may contain one or more software modules for detecting and processing a signal from the accelerometer 22 that corresponds to a change in acceleration from a buffet indicative of a doorway 26 or landing 28 or the counter weights 24 as described above.

Still referring to FIG. 5B, the pressure logic 534 may contain one or more software modules for detecting and processing a signal from the pressure sensor that corresponds to a change in pressure indicative of a door or landing or the counter weights as described above.

The current position logic 540 may contain one or more software modules for initiating the monitoring controller 30 to receive a signal indicative of first, second or third estimated positions. It should be appreciated that the gathering of the data may be continuous or may be performed at predetermined discrete times.

Figure 5C:
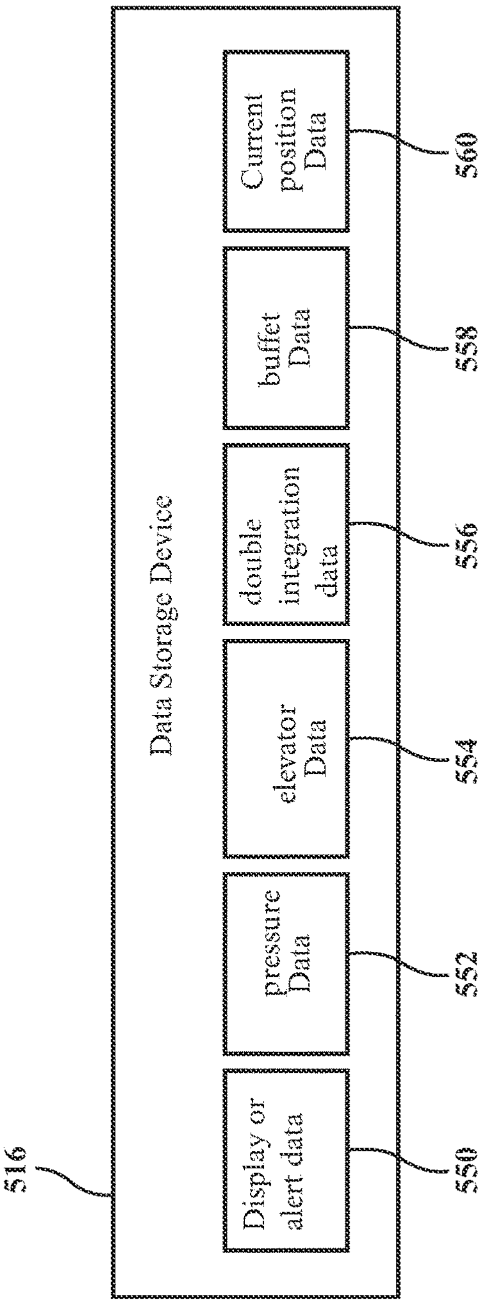
FIG. 5C schematically depicts an illustrative data storage device containing illustrative data components according to one or more embodiments shown and described herein.

FIG. 5C schematically depicts a block diagram of various data contained within a storage device (e.g., the data storage device 516). It should be understood that the data storage device 516 may reside local to and/or remote from the monitoring controller 30 and may be configured to store one or more pieces of data for access by the monitoring controller 30.

As shown in FIG. 5C, the data storage device 516 may include, for example, a display or alert data 550. The data storage device 516 further includes the pressure data 552 from the pressure sensor 34, elevator data 554 such as the known variables of the specified elevator, double integration data 556, buffet data 558 from the accelerometer 22 and current position data 560 that may store or data indicative of first, second or third estimated positions of the elevator cab 12.

As mentioned above, the various components described with respect to FIGS. 5A-5C may be used to carry out one or more processes to improve accuracy of determining position of the elevator cab 12 in the hoistway 16 using the accelerometer 22 and/or the pressure sensor 34. Further, it should be understood that the components depicted in FIGS. 5A-5C are merely illustrative and are not intended to limit the scope of this disclosure. More specifically, while the components in FIGS. 5A-5C are illustrated as residing within the monitoring controller 30, this is a non-limiting example. In some embodiments, one or more of the components may reside external to the monitoring controller 30. Similarly, while FIGS. 5A-5C is directed to the monitoring controller 30, other components such as the elevator controller 32 may include similar hardware, software, and/or firmware and may be configured to perform some or all of the functions and processes described herein.

Referring now to FIGS. 3A-3F various embodiments of the method are described.

Figure 3A:
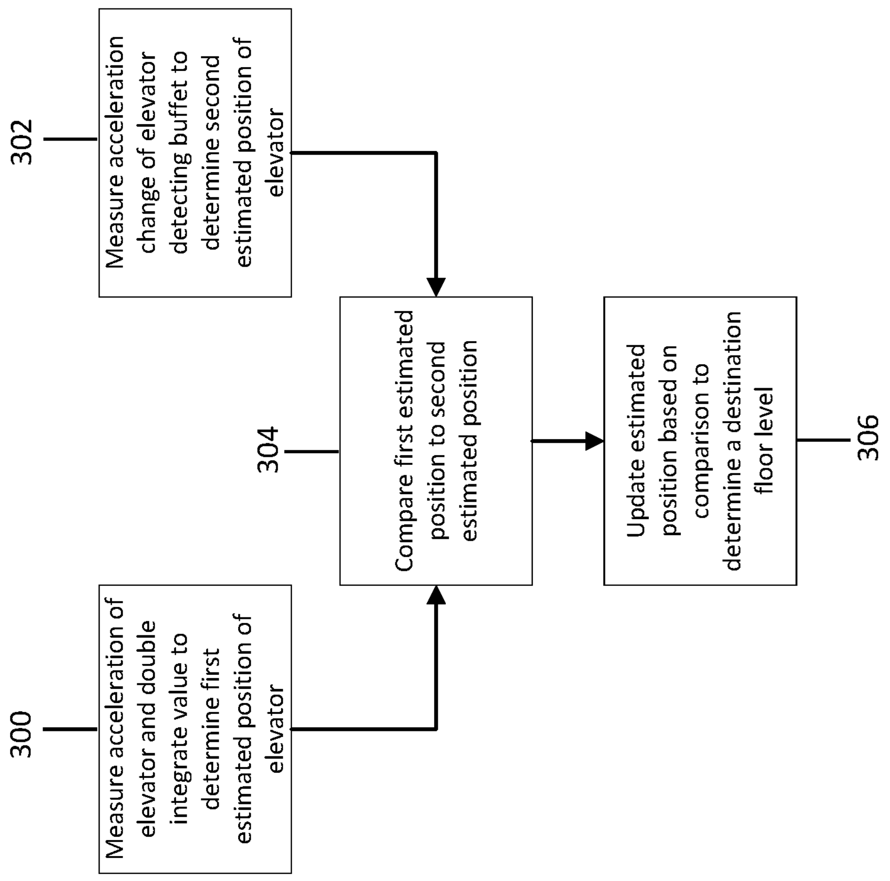
FIG. 3A depicts a flow diagram of an illustrative method for determining the position of an elevator according to one or more embodiments shown and described herein.

In FIG. 3A, at block 300, the acceleration is measured by the accelerometer and a double integration of the data is performed to provide a first estimated position of the elevator cab. At block 302, the accelerometer measures a change in acceleration detecting a buffet to provide a second estimated position of the elevator cab. It should be realized that the measured change in acceleration may be corresponding to the various doors or landings as described above or due to the counterweight as described above. The measured signals may be applied at various intervals such as on every floor or at various floor intervals.

In one aspect, the first measured signal may be the counterweight in an express elevator as shown in FIG. 2B. The next measured signal may be the first floor that is accessible from the express elevator. In another aspect, landings or doors may be on every floor and would generate a signal at each floor.

At block 304, the first and second estimated positions are compared. At block 306, the estimated position is updated based on the comparison. The comparison may involve applying a predetermined threshold such that if the first estimated position is within a certain amount of the second estimated position, then the first position will be the updated position. If the threshold is exceeded then the second estimated position will be the updated position. The predetermined threshold may vary based upon the elevator type, the number of floors the elevator serves and whether it is an express elevator.

Figure 3B:
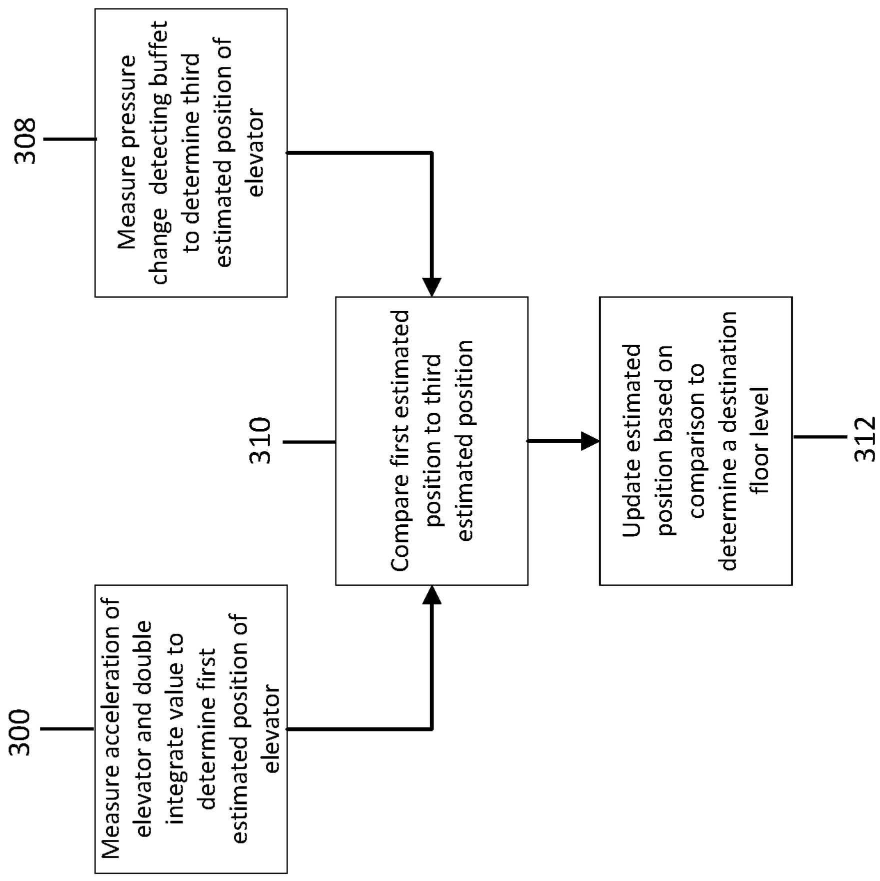
FIG. 3B depicts a flow diagram of an illustrative method for determining the position of an elevator according to one or more embodiments shown and described herein.

In FIG. 3B, at block 300, the acceleration is measured by the accelerometer and a double integration of the data is performed to provide a first estimated position of the elevator cab.

At block 308, the pressure sensor measures a change in pressure detecting a buffet to provide a third estimated position of the elevator cab. It should be realized that the measured change in pressure may be corresponding to the various doors or landings as described above or due to the counterweight as described above. The measured signals may be applied at various intervals such as on every floor or at various floor intervals, such as every other floor or every third floor. Various intervals may be utilized.

In one aspect, the first measured signal may be the counterweight in an express elevator as shown in FIG. 2B. The next measured signal may be the first floor that is accessible from the express elevator. In another aspect, landings or doors may be on every floor and would generate a signal at each floor.

At block 310, the first and third estimated positions are compared. At block 312, the estimated position is updated based on the comparison to determine a floor level. The comparison may involve applying a predetermined threshold such that if the first estimated position is within a certain amount of the third estimated position, then the first position will be the updated position. If the threshold is exceeded then the third estimated position will be the updated position. The predetermined threshold may vary based upon the elevator type, the number of floors the elevator serves and whether it is an express elevator.

Figure 3C:
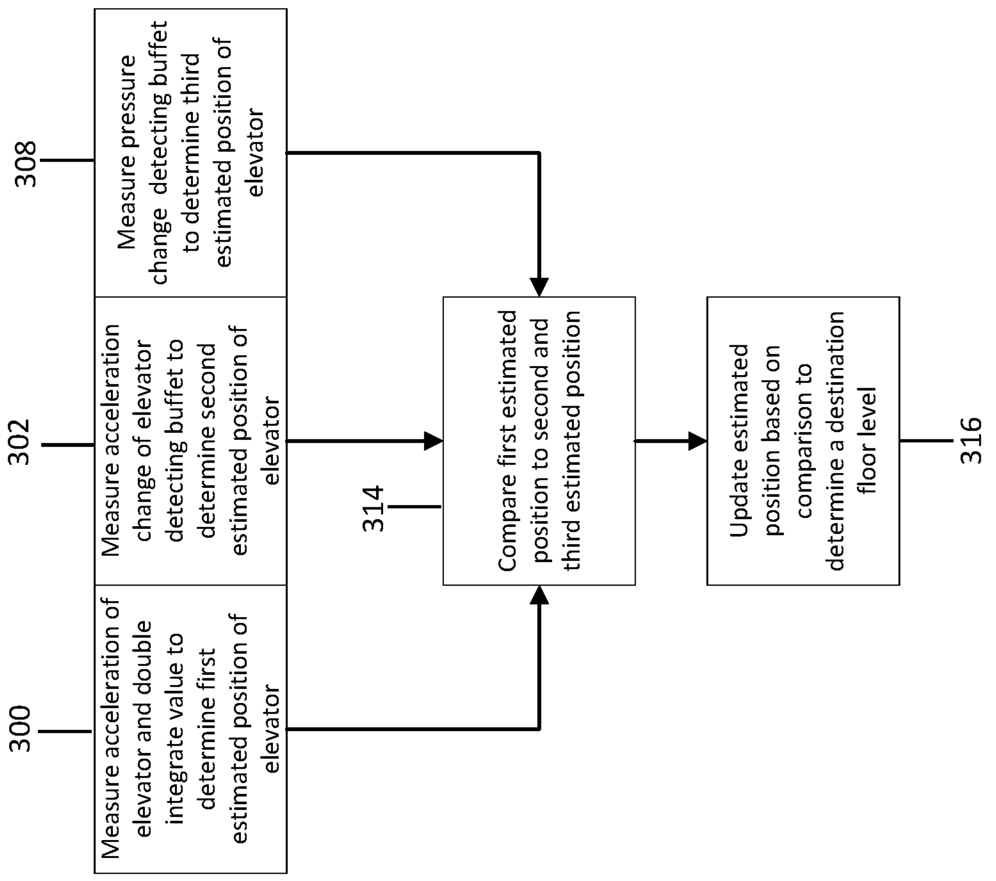
FIG. 3C depicts a flow diagram of an illustrative method for determining the position of an elevator according to one or more embodiments shown and described herein.

In FIG. 3C, at block 300, the acceleration is measured by the accelerometer and a double integration of the data is performed to provide a first estimated position of the elevator cab.

At block 302, the accelerometer measures a change in acceleration detecting a buffet to provide a second estimated position of the elevator cab. It should be realized that the measured change in acceleration may be corresponding to the various doors or landings as described above or due to the counterweight as described above. The measured signals may be applied at various intervals such as on every floor or at various floor intervals.

At block 308, the pressure sensor measures a change in pressure detecting a buffet to provide a third estimated position of the elevator cab. It should be realized that the measured change in pressure may be corresponding to the various doors or landings as described above or due to the counterweight as described above. The measured signals may be applied at various intervals such as on every floor or at various floor intervals.

At block 314, the first, second and third estimated positions are compared. At block 316, the estimated position is updated based on the comparison to determine a floor level. The comparison may involve applying a predetermined threshold such that if the first estimated position is within a certain amount of the second and or third estimated position, then the first position will be the updated position. If the threshold is exceeded then the second or third estimated position will be the updated position. The predetermined threshold may vary based upon the elevator type, the number of floors the elevator serves and whether it is an express elevator.

Various weighting may be given to either the second or third estimated positions in the comparison step. For example, the second estimated position may control if the first and third estimated positions are within a predetermined threshold. Alternatively, the third estimated position may control if the first and second estimates positions are within a predetermined threshold. Further a weighted average of the second and third estimated positions may be calculated and compared to the first estimated position as described above.

Figure 3D:
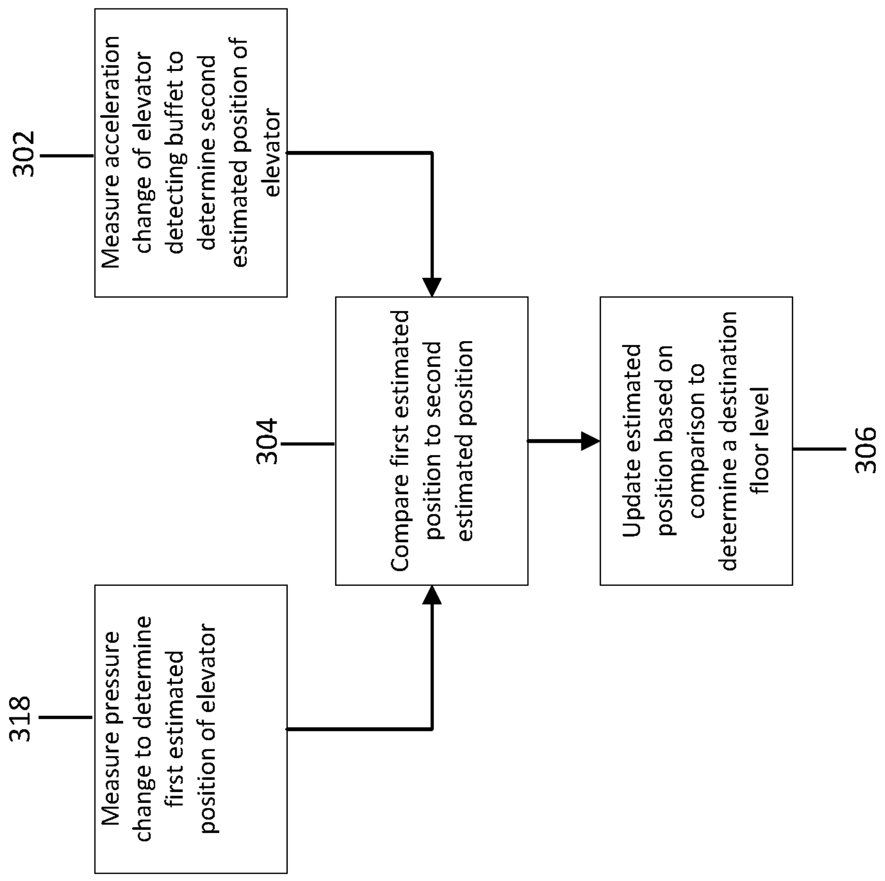
FIG. 3D depicts a flow diagram of an illustrative method for determining the position of an elevator according to one or more embodiments shown and described herein.

In FIG. 3D, at block 318, the pressure change is measured by the pressure sensor to provide a first estimated position of the elevator cab. At block 302, the accelerometer measures a change in acceleration detecting a buffet to provide a second estimated position of the elevator cab. It should be realized that the measured change in acceleration may be corresponding to the various doors or landings as described above or due to the counterweight as described above. The measured signals may be applied at various intervals such as on every floor or at various floor intervals.

In one aspect, the first measured signal may be the counterweight in an express elevator as shown in FIG. 2B. The next measured signal may be the first floor that is accessible from the express elevator. In another aspect, landings or doors may be on every floor and would generate a signal at each floor.

At block 304, the first and second estimated positions are compared. At block 306, the estimated position is updated based on the comparison. The comparison may involve applying a predetermined threshold such that if the first estimated position is within a certain amount of the second estimated position, then the first position will be the updated position. If the threshold is exceeded then the second estimated position will be the updated position. The predetermined threshold may vary based upon the elevator type, the number of floors the elevator serves and whether it is an express elevator.

Figure 3E:
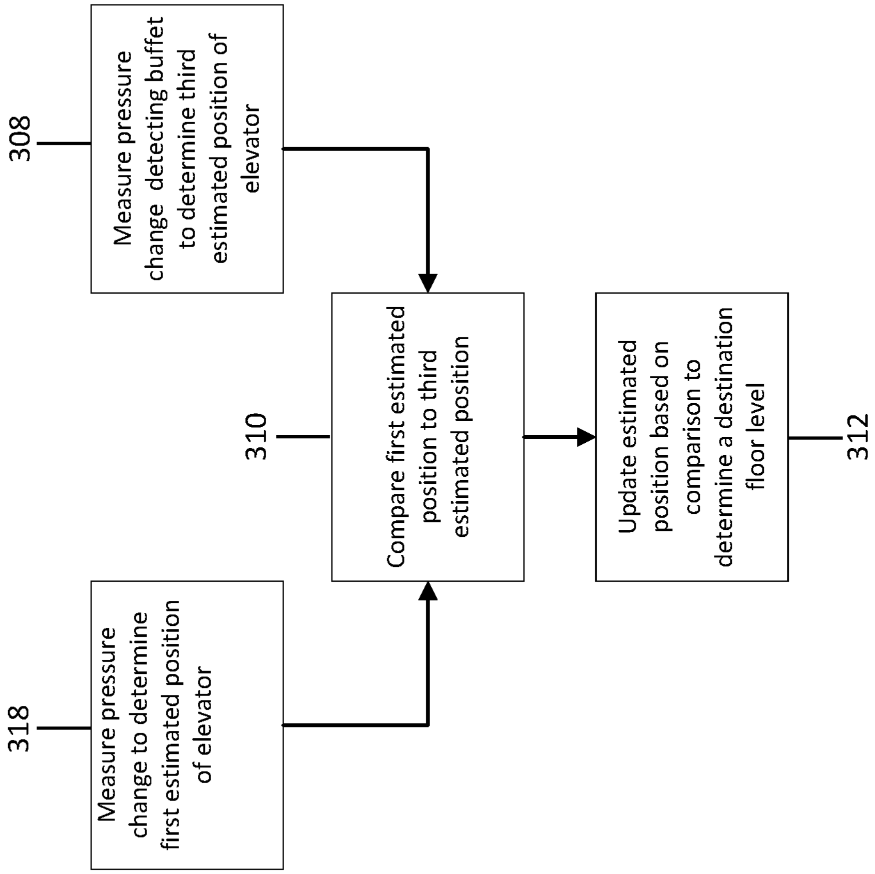
FIG. 3E depicts a flow diagram of an illustrative method for determining the position of an elevator according to one or more embodiments shown and described herein.

In FIG. 3E, at block 318, the pressure change is measured by the pressure sensor to provide a first estimated position of the elevator cab. At block 308, the pressure sensor measures a change in pressure detecting a buffet to provide a third estimated position of the elevator cab. It should be realized that the measured change in pressure may be corresponding to the various doors or landings as described above or due to the counterweight as described above. The measured signals may be applied at various intervals such as on every floor or at various floor intervals, such as every other floor or every third floor. Various intervals may be utilized.

In one aspect, the first measured signal may be the counterweight in an express elevator as shown in FIG. 2B. The next measured signal may be the first floor that is accessible from the express elevator. In another aspect, landings or doors may be on every floor and would generate a signal at each floor.

At block 310, the first and third estimated positions are compared. At block 312, the estimated position is updated based on the comparison to determine a floor level. The comparison may involve applying a predetermined threshold such that if the first estimated position is within a certain amount of the third estimated position, then the first position will be the updated position. If the threshold is exceeded then the third estimated position will be the updated position. The predetermined threshold may vary based upon the elevator type, the number of floors the elevator serves and whether it is an express elevator.

Figure 3F:
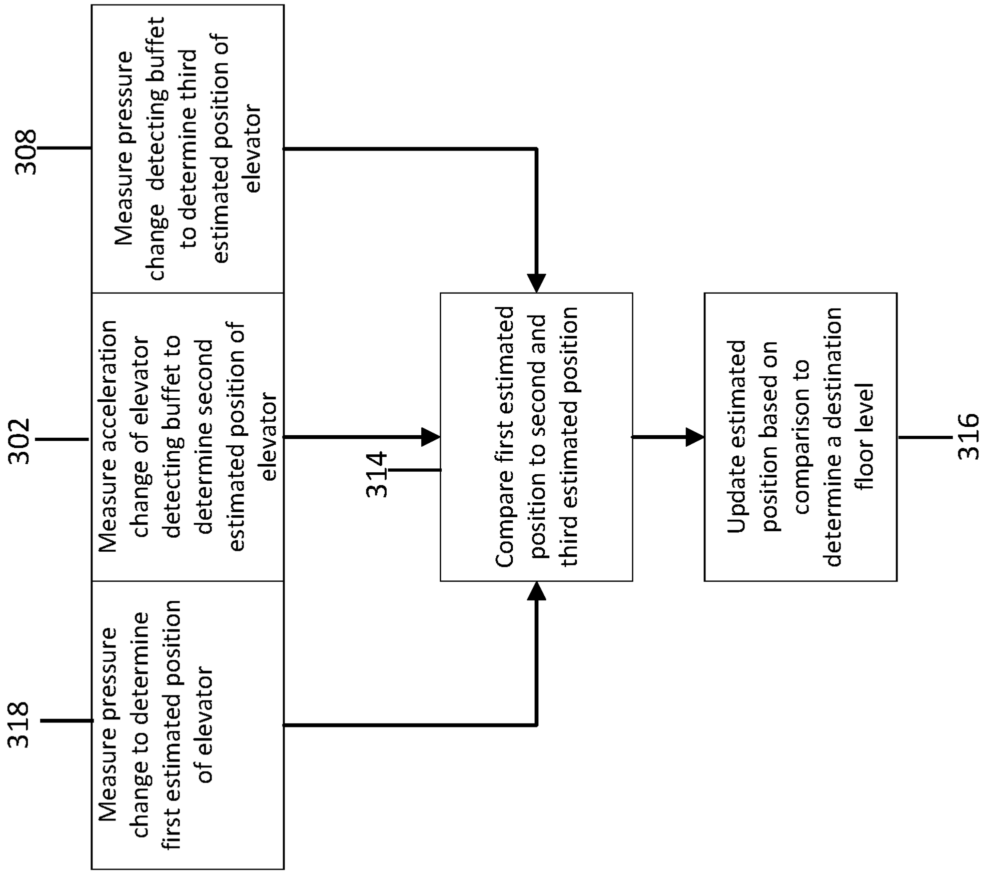
FIG. 3F depicts a flow diagram of an illustrative method for determining the position of an elevator according to one or more embodiments shown and described herein.

In FIG. 3F, at block 318, the pressure change is measured by the pressure sensor to provide a first estimated position of the elevator cab.

At block 302, the accelerometer measures a change in acceleration detecting a buffet to provide a second estimated position of the elevator cab. It should be realized that the measured change in acceleration may be corresponding to the various doors or landings as described above or due to the counterweight as described above. The measured signals may be applied at various intervals such as on every floor or at various floor intervals.

At block 308, the pressure sensor measures a change in pressure detecting a buffet to provide a third estimated position of the elevator cab. It should be realized that the measured change in pressure may be corresponding to the various doors or landings as described above or due to the counterweight as described above. The measured signals may be applied at various intervals such as on every floor or at various floor intervals.

At block 314, the first, second and third estimated positions are compared. At block 316, the estimated position is updated based on the comparison to determine a floor level. The comparison may involve applying a predetermined threshold such that if the first estimated position is within a certain amount of the second and or third estimated position, then the first position will be the updated position. If the threshold is exceeded then the second or third estimated position will be the updated position. The predetermined threshold may vary based upon the elevator type, the number of floors the elevator serves and whether it is an express elevator.

Various weighting may be given to either the second or third estimated positions in the comparison step. For example, the second estimated position may control if the first and third estimated positions are within a predetermined threshold. Alternatively, the third estimated position may control if the first and second estimates positions are within a predetermined threshold. Further a weighted average of the second and third estimated positions may be calculated and compared to the first estimated position as described above.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining a vertical position of an elevator cab in a hoistway comprising the steps of:
- providing the elevator cab positioned in the hoistway;
- providing an accelerometer attached to the elevator cab;
- providing a monitoring controller communicatively coupled to the accelerometer;
- measuring an acceleration using the accelerometer for a run sequence of the elevator cab;
- calculating a double integration of the acceleration determining a first estimated position of the elevator cab in the hoistway;
- measuring a change in acceleration using the accelerometer and detecting at least one buffet;
- determining a second estimated position of the elevator cab in the hoistway based upon the at least one detected buffet;
- comparing the first and second estimated positions;
- determining a current position of the elevator cab in the hoistway;
- providing the current position of the elevator cab in the hoistway to an elevator controller; and
- updating, by the elevator controller, the current position of the elevator cab in the hoistway to determine a floor level of the elevator cab.

2. The method of claim 1, wherein the at least one detected buffet corresponds to the elevator cab passing a door or landing.

3. The method of claim 1, wherein the at least one detected buffet corresponds to the elevator cab passing a counterweight.

4. The method of claim 1, wherein the at least one detected buffet corresponds to a change in the acceleration or a vibration in an x or y axis of the elevator cab.

5. The method of claim 1, wherein the at least one detected buffet includes a plurality of detected buffets.

6. The method of claim 1, wherein the step of comparing includes applying a predetermined threshold to determine the current position.

7. A method for determining a vertical position of an elevator cab in a hoistway comprising the steps of:
- providing the elevator cab positioned in the hoistway;
- providing an accelerometer attached to the elevator cab;
- providing a pressure sensor either on the elevator cab or within the hoistway;
- providing a monitoring controller communicatively coupled to the accelerometer and the pressure sensor;
- measuring an acceleration using the accelerometer for a run sequence of the elevator cab;
- calculating a double integration of the acceleration determining a first estimated position of the elevator cab in the hoistway or measuring a pressure change determining a first estimated position of the elevator cab in the hoistway;
measuring a change in pressure using the pressure sensor and detecting at least one buffet;
determining a third estimated position of the elevator cab in the hoistway;
comparing the first and third estimated positions;
determining a current position of the elevator cab in the hoistway;
providing the current position of the elevator cab in the hoistway to an elevator controller; and
updating, by the elevator controller, the current position of the elevator cab in the hoistway to determine a floor level of the elevator cab.

8. The method of claim 7, wherein the at least one detected buffet corresponds to the elevator cab passing a door or landing.

9. The method of claim 7, wherein the at least one detected buffet corresponds to the elevator cab passing a counterweight.

10. The method of claim 7, wherein the at least one detected buffet corresponds to a change in the acceleration or a vibration in an x or y axis of the elevator cab.

11. The method of claim 7, wherein the at least one detected buffet includes a plurality of detected buffets.

12. The method of claim 7, wherein the step of comparing includes applying a predetermined threshold to determine the current position.

13. A method for determining a vertical position of an elevator cab in a hoistway comprising the steps of:
providing the elevator cab positioned in the hoistway;
providing an accelerometer attached to the elevator cab;
providing a pressure sensor either on the elevator cab or within the hoistway;
providing a monitoring controller communicatively coupled to the accelerometer and the pressure sensor;
measuring an acceleration using the accelerometer for a run sequence of the elevator cab;
determining a first estimated position of the elevator cab in the hoistway;
measuring a change in pressure using the pressure sensor detecting at least one buffet;
determining a third estimated position of the elevator cab in the hoistway;
measuring a change in the acceleration using the accelerometer detecting at least one buffet;
determining a second estimated position of the elevator cab in the hoistway;
comparing the first, second and third estimated positions;
determining a current position of the elevator cab in the hoistway;
providing the current position of the elevator cab in the hoistway to an elevator controller; and
updating, by the elevator controller, the current position of the elevator cab in the hoistway to determine a floor level of the elevator cab.

14. The method of claim 13, further comprising the step of:
calculating a double integration of the acceleration to determine the first estimated position of the elevator cab in the hoistway;
wherein the at least one detected buffet corresponds to a change in the acceleration or a vibration in an x or y axis of the elevator cab.

15. The method of claim 13, further comprising the step of:
measuring a pressure change to determine the first estimated position of the elevator cab in the hoistway.

16. The method of claim 13, wherein the at least one detected buffet corresponds to the elevator cab passing a door or landing.

17. The method of claim 13, wherein the at least one detected buffet corresponds to the elevator cab passing a counterweight.

18. The method of claim 13, wherein the at least one detected buffet includes a plurality of detected buffets.

19. The method of claim 13, wherein the step of comparing includes applying a predetermined threshold to determine the updated position.

20. The method of claim 13, wherein the step of comparing includes applying a weighting to the second and third estimated positions.

* * * * *